United States Patent [19]
Thomas

[11] 3,713,991
[45] Jan. 30, 1973

[54] RECOVERY OF DIMETHYLFORMAMIDE BY CRYSTALLIZATION AND DISTILLATION

[75] Inventor: Brian Edward Alston Thomas, Wilmslow, Cheshire SK 92 JY, England

[73] Assignee: Porvair Limited, Norfolk, England

[22] Filed: May 27, 1970

[21] Appl. No.: 40,846

[30] Foreign Application Priority Data

May 28, 1969  Great Britain.................26985/69
Aug. 21, 1969  Great Britain.................41832/69

[52] U.S. Cl. .....................203/48, 203/14, 203/82, 203/99, 202/155, 23/303, 260/561 R
[51] Int. Cl. .......................C07c 103/36, B01d 9/00
[58] Field of Search...260/561 R; 202/155, 153, 175; 203/14, 48, 47, 81, 82, 84, 94, DIG. 9; 159/45; 23/302, 303

[56] References Cited

UNITED STATES PATENTS

| | | |
|---|---|---|
| 3,231,605 | 1/1966 | Blumbergs..............................203/48 |
| 2,773,815 | 12/1956 | Nicolaisen...........................203/82 |
| 2,640,017 | 5/1953 | Graff......................................203/99 |
| 3,294,651 | 12/1966 | Pasin...............................260/561 R |
| 2,417,862 | 3/1947 | Dale......................................203/14 |
| 2,895,886 | 7/1959 | Schneider............................202/153 |
| 3,530,043 | 9/1970 | Horn et al. .........................202/155 |

FOREIGN PATENTS OR APPLICATIONS 715,839  9/1954  Great Britain.................260/561 R Primary Examiner—Wilbur L. Bascomb, Jr.
Attorney—Watson, Cole, Grindle & Watson

[57] ABSTRACT

Solvent recovery process and apparatus for separating pure dimethylformamide from admixture with sodium chloride and water using a first stage of partial evaporation producing salt crystallization and separation and a second stage of fractional distillation using a high volume bottom products flow.

5 Claims, 3 Drawing Figures

INVENTORS
BRIAN EDWARD
ALSTON THOMAS

RECOVERY OF DIMETHYLFORMAMIDE BY CRYSTALLIZATION AND DISTILLATION

This invention relates to the recovery in substantially pure form of polar organic solvents from mixtures with one or more liquid components miscible therewith, the mixtures containing at least one dissolved solid component. It is particularly applicable to the recovery of expensive water soluble polar organic solvents for example acylamides such as N,N'-dimethyl-formamide from aqueous solutions of such solvents which contain dissolved solids for example inorganic salts such as chlorides especially sodium, potassium or calcium chlorides. It is particularly useful in achieving the separation of materials, such as dimethylformamide, which are less volatile than water, though it may be applicable to any mixture of two liquids from which it is wished to recover the less volatile component in pure form. The invention extends both to methods of carrying out the solvent recovery and also to apparatus for carrying out the method.

Certain earlier proposals have suggested that dimethylformamide should be recovered from aqueous solutions containing inorganic salts by extraction of the dimethylformamide with a suitable solvent such as methylene chloride. However, this process requires the use of a complex plant to effect the subsequent separation of the dimethylformamide from the extracting solvent. In addition some of the expensive extracting solvent is lost in the aqueous stream leaving the extraction apparatus. In addition the extraction of the dimethylformamide from the raw feedstock is not essentially complete and therefore the waste aqueous stream contains small amounts of dimethylformamide in addition to containing small amounts of the extracting solvent and these amounts are such as to render the effluent unsuitable for discharge direct into water courses or sewers without further additional treatment which adds to the cost of the total process.

Another proposal has been that the dimethylformamide should be recovered from aqueous solutions containing dissolved inorganic salts by counter current stripping a substantial part of the dimethylformamide using open steam in a stripping column. The dimethylformamide would then be subsequently separated from the water by distillation. However, the vapor/liquid equilibrium of a dimethylformamide/water mixture does not favor the removal of dimethylformamide in this way except in cases where the inorganic salts possess the property of effectively reducing the vapor pressure of the water component of the mixture below that of the dimethylformamide. Even in cases where the salt can have this effect it has to be present in a concentration sufficiently high to bring about the required reduction in vapor pressure of the water component. The process is thus not generally applicable. In addition the aqueous residue from the stripping column again is liable to contain some dimethylformamide and this may be such as to render the effluent unsuitable for discharge into a water course or sewer without further treatment which once more will raise the cost of the total process.

It is an object of the present invention to provide a process for the separation of organic liquids from aqueous solutions containing dissolved solids which is more generally applicable than the known processes and which is also cheaper. It is a further object to provide a process whereby a higher proportion of the original organic solvent in the feedstock can be recovered and the effluent from the process contains sufficiently low amounts, if any, of the organic liquid to render the aqueous effluent acceptable for direct discharge into water courses or sewers without further treatment. It is yet another object of the invention to provide a process whereby the recovered organic liquid is of high purity enabling it to be reused in the process from which it was originally an effluent.

According to the present invention a method of recovering a polar organic solvent, for example N,N'-dimethylformamide, from a feedstock comprising a mixture of the said polar organic solvent and at least one other liquid component miscible therewith, for example water, the said mixture containing at least one dissolved solid component, for example sodium chloride, comprises evaporating off at least part of the liquid components leaving a mother liquor whereby dissolved solid is caused to precipitate in the mother liquor separating substantially liquor free solid from the mother liquor, and separating the said polar organic solvent from the mixture of evaporated liquid components, for example by evaporative separation techniques such as fractional distillation.

It is intended to describe the invention with reference to dimethylformamide, water and sodium chloride but it should be appreciated that it is applicable to other systems as well. Thus organic solvents other than dimethylformamide could be recovered by the process and the second liquid component need not necessarily be water and could be other liquids miscible with the organic liquid component which it is intended to recover. In addition, the dissolved solid component could be other than sodium chloride.

Effluent of this sort are produced by certain processes used in the production of microporous polymer sheet materials in particular from polyurethanes but other solvent systems containing dissolved solid components may be involved with alternative processes. These may be systems in which the first component is a polar solvent such as dimethylformamide, dimethylacetamide or dimethylsulphoxide and the second liquid component may be water though it can be other hydroxyl containing liquids such as alcohols or glycols for example propylene glycol or ketones such as acetone or similar materials which have the effect of reducing the solubility of the polymer in a solution of the polymer in a solution of the polar organic solvent. The dissolved solid may be any material which is soluble in the system and which facilitates or assists in coagulation of the polymer or the production of an even fine pore size. Such materials include ammonium nitrate and urea. With such materials it will of course be necessary to take particular care as to the temperature conditions involved to make certain that explosion hazards do not arise.

It will be appreciated that the process defined above need not necessarily be carried out at atmospheric pressure and could easily be carried out at subatmospheric pressures or at super-atmospheric pressures if the particular vapor pressure relationships of the components involved made this desirable. The dissolved solid component precipitated or crystallized in the mother liquor is separated therefrom by any known means for example by centrifuge or filter arrangement. Preferably this separation is achieved by drawing off mother liquor containing precipitated solid and separating the solid from entrained liquor which is returned to the main body of mother liquor.

The precipitation can be carried out as a continuous process in the base of the evaporator and solids containing mother liquor continuously withdrawn to a continuously operating centrifuge or the precipitation can be carried out in a separate salt box separated from the evaporator and the centrifuge by valves. The precipitation is then a batch process.

In one form of the invention the evaporated liquid components in the vapor phase are fed to a fractionating column or a fractionating apparatus adapted for use with the particular liquid components involved and this is preferably run so that the lighter component is separated from the top of the column substantially freed from the heavier component which is received from the bottom of the column. This heavier component may be passed through a re-boiler, the heavy fraction from this re-boiler may be passed to a still from which substantially purified first component can be evaporated. Traces of impurities of heavier components and traces of dissolved solid still present in the system can be periodically removed from the bottom of the said still.

According to a further aspect of the invention apparatus for carrying out the method in accordance with the first aspect of the invention comprises evaporator means provided with heating means, for example an external pump circuit including a heating device, and with outlet means to separative means for separating the evaporated liquid components for example evaporative separating means and with outlet means enabling solids produced in the evaporator means to be discharged, for example under gravity, to solids separating means for separating the solid from entrained liquid and means for returning the separated liquid to the evaporator means.

Preferably the evaporative separating means is a fractional distillation column desirably provided with reboiling means for returning the vaporized part of the heavier output fraction to the base of the column and recycling condenser means for returning the portion of the lighter fraction from the column as a reflux flow to the head of the column.

A still and means for passing the heavier fraction of the reboiled output from the base of the column may also be provided. Substantially pure first component can be evaporated off from the said still and the heavier fractions in the said still either passed to discharge or returned to the evaporator for example by the same means as the separated liquid is returned to the evaporator from the solids separating means.

The invention can be put into practice in various ways but as mentioned above will be described with reference to the recovery of dimethylformamide from an aqueous solution containing dissolved sodium chloride, and with reference to the accompanying diagrammatic drawing illustrating one specific embodiment of the process and apparatus for carrying it out, and two modifications thereof.

Figure 1:
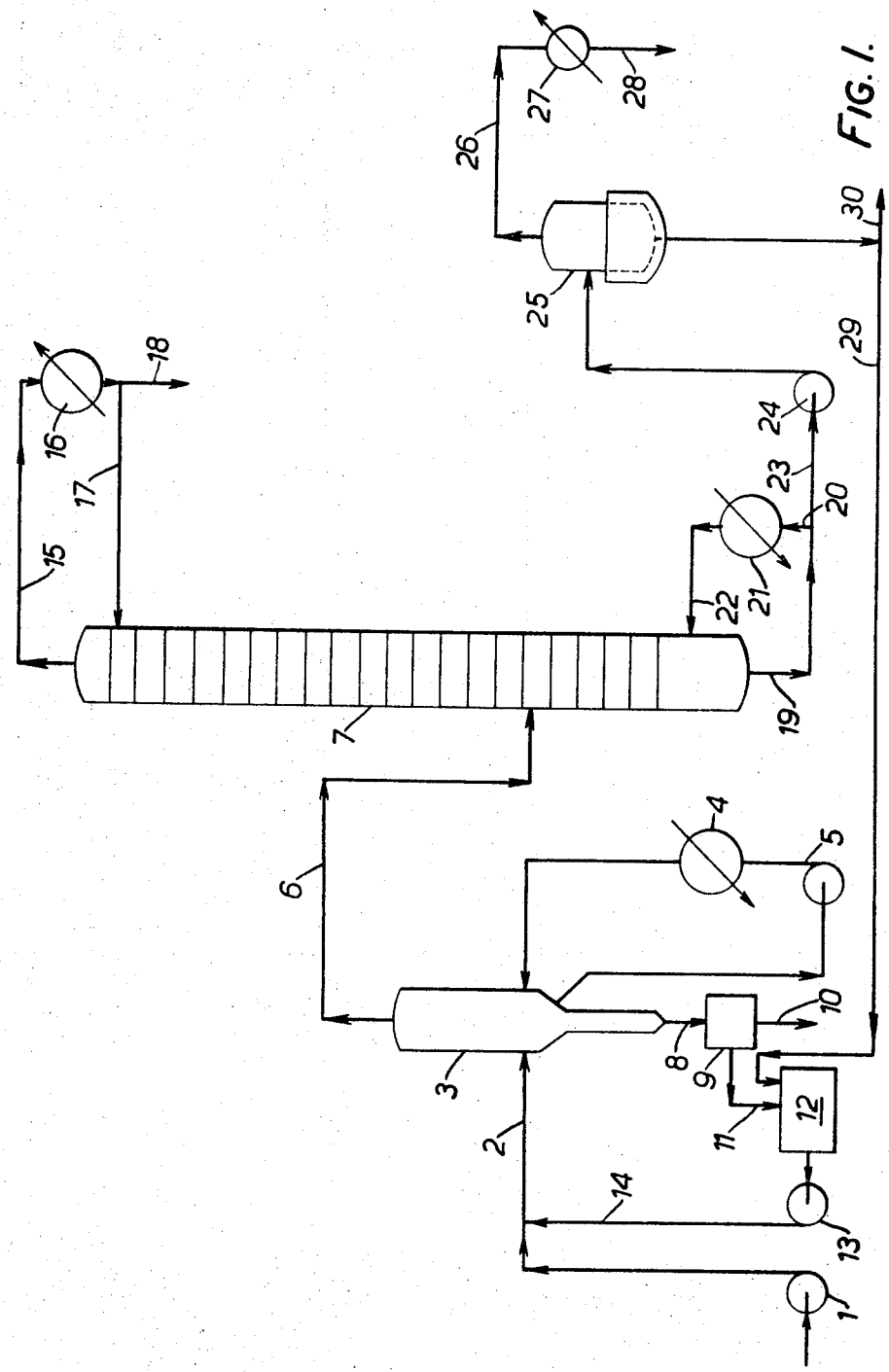
FIG. 1 is an outline flow diagram of the process and a diagrammatic representation of apparatus for carrying out the process.

The feedstock material, containing dimethylformamide and the inorganic salt in aqueous solution, is delivered by a pump 1 via a conduit 2 to an evaporator 3. The evaporator 3 is provided with an external heating circuit comprising a calandria 4 and a circulating pump 5. The calandria may be heated by steam or other suitable medium and the heat added causes at least part of the liquid portion of the feedstock to vaporize. The vapors pass from the evaporator 3 by the conduit 6 to the feedplate of a distillation column 7.

As a result of evaporation of the feedstock in the evaporator 3 the salt is precipitated and is discharged in the form of a crystal suspension in the mother liquor from the evaporator through a conduit 8 to separating means 9, which can be a centrifuge or a filter. Solid salt, substantially freed of liquor, is discharged, via a conduit 10 for disposal. Means may be provided at the separating means 9 for washing the solid salt with water, prior to discharge. The other liquor separated from the salt in the separating means 9 flows via a conduit 11 into a tank 12, from which it is returned to the evaporator by a pump 13, a conduit 14 and the conduit 2.

The vapors entering the fractional distillation column 7 from the evaporator 3 pass up the column 7 and leave at the top via a conduit 15 and thence to a condenser 16. The condensate from the condenser 16 is divided into two parts, by any known means, one part being returned to the head of the column 7 via a conduit 17 as a reflux. The other part of the condensate flows, via a conduit 18 to storage or other disposal. This part contains a substantial proportion of the volatile amines present as impurities in the dimethylformamide.

The reflux flows down the column 7 and leaves at the base via a conduit 19. Some of this refluxed liquid then flows via a conduit 20 into a reboiler 21, where heat is added, by means of steam or any other suitable medium, as is necessary efficiently to perform the function of fractional distillation in the column 7. The vapor and liquid stream from the reboiler 21 then passes via a conduit 22 into the base of the column 7.

Recovered dimethylformamide, in quantity approximating to that in the feedstock is withdrawn via a conduit 23, aided if necessary by a pump 24 and delivered to a still 25. In the still 25, heat is added, by steam or any other suitable medium, so as completely to vaporize the dimethylformamide delivered to the still. The resulting vapors pass via a conduit 26 to a condenser 27. Condensed dimethylformamide flows from the condenser 27, via a conduit 28 to storage.

Impurities and materials of low volatility, which collect in the said still 25 are discharged either periodically or continuously via the conduit 29 into the mother liquor tank 12. By these means, any solid materials, such as salt, tending to accumulate in the still 25 is purged from the system and will eventually be discharged as solid, at the separating means 9. Provision may also be made for discharging some of the residual liquor from the still 25, via a conduit 30 for disposal.

Although described as having an external calandria, the evaporator may be of any known type, suitable for salting applications.

It will be apparent that the final still 25 can be arranged for either continuous or batch operation.

While it is normally envisaged that the vapors will be passed from the evaporator to the fractional distillation column, in certain circumstances, it may be convenient fully to condense the said vapors and subsequently to feed the resulting condensed liquid to the fractional distillation column. In this case, the evaporator may take the form of a plurality of evaporators operating in series, in multiple effect.

Where the recovered organic chemical, produced from the final still, contains an impurity of relative volatility lower than that of the organic chemical, the said organic chemical may be purified by further distillation in a fractional distillation column, according to the established techniques of fractional distillation. In this event, it will be convenient to take the vapors from the final still directly into the said fractional distillation column.

Figures 2, 3:
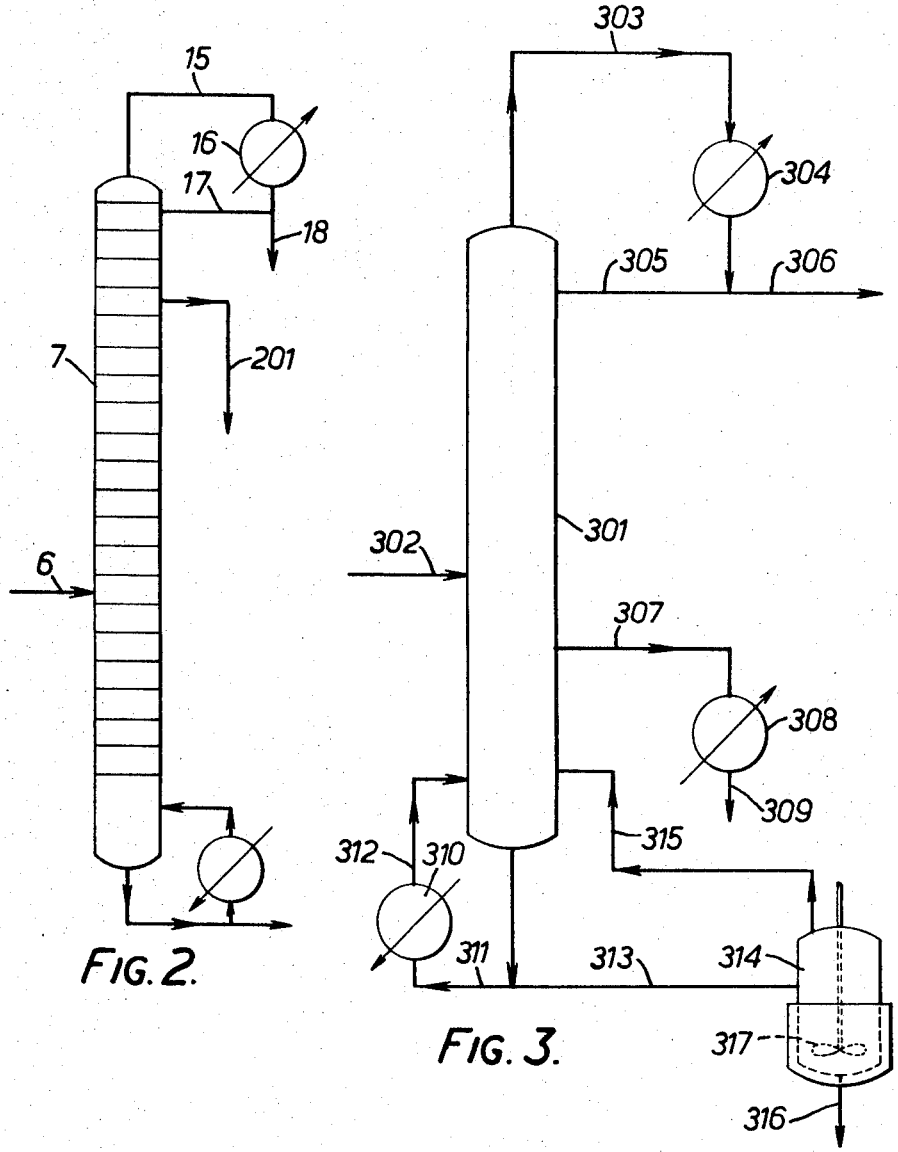
FIG. 2 is a flow diagram of the first modification of the invention used to produce a pure water effluent stream.
FIG. 3 is a flow diagram of the second modification of the invention used to separate formic acid and involatile impurities when N,N' dimethylformamide is the desired product.

This invention also extends to a modification to the process useful in the separation of volatile impurities or decomposition products, such as amines, from the water effluent. It is illustrated in FIG. 2. These are volatile impurities liable to contaminate the water fraction produced by distillation of aqueous solutions of certain organic water soluble solvents such as dimethylformamide with which the present invention is especially concerned. When dimethylformamide is brought into contact with water, some volatile amines, principally dimethylamine, are formed as a result of hydrolysis. In the separation of the water from the dimethylformamide, in a distillation process, the water is the more volatile component and passes to the top of the fractional distillation equipment, while the dimethylformamide passes to the bottom. The amines resulting from hydrolysis are more volatile than water and, if the water fraction is taken directly from the top of the column, it is contaminated with the amines. The quantity of amines present in such a water fraction generally will be such as to preclude the direct discharge of the aqueous stream into a water course. Furthermore, the presence of even relatively small quantities of the amines impart a strong and unpleasant odor to the water making it often unacceptable for re-use as process water. It is possible to remove amines from such a water stream by ion exchange, but the capital and running costs of such measures are not normally attractive. Moreover, the regeneration of the ion exchange medium would require the use of chemical reagents, the discharge of which would present a further effluent problem. It would be possible to redistill the amine containing water in a further distillation unit, but again, the capital and operating costs would make this unattractive.

According to this form of the present invention when the mixture of evaporated liquid components comprises water optionally volatile and N,N'-dimethylformamide a water stream of effluent purity is removed therefrom in a fractional distillation apparatus by running the high volatility region of the apparatus under conditions of high reflux so that the volatile amines concentrated therein and removing the water stream as a side stream from a lower volatility region of the apparatus the N,N' dimethylformamide being removed from the low volatility region of the apparatus. The apparatus is conveniently a vertical distillation column and then the high volatility region is the top of the column. The amines would be discharged, as an amine rich solution in water, as part of the condensate stream from the condenser receiving vapors from the head of the column. Apparatus for carrying out this aspect of the present invention comprises fractional distillation apparatus provided with an additional section at the high volatility region, means for running this section at high reflux and output means for withdrawing a side-stream from a region of lower volatility adjacent the said high volatility section and output means for withdrawing a side stream from a low volatility region. The feedstock is produced by the method and apparatus described in connection with FIG. 1. Referring now to FIG. 2, 6 is the feed to a distillation column 7. The vapors pass to the head of this column and through a conduit 15 into a condenser 16. The condensate from this condenser is divided, the major part returning via the conduit 17 to the head of the column as reflux and the small remaining part being discharged via the conduit 18, as an amine rich solution in water, for disposal. The water fraction, substantially free of amines, leaves the column as a side stream, via the conduit 201.

Typical operating conditions for such a plant might be as follows:

The column has six plates above the side-stream conduit 201 and they are run at a reflux ratio of 159 to 1. An amine rich stream is removed from conduit 18 at a rate of about 200 lbs/hour, and contains approximately 1.0 percent w/w dimethylamine. An effluent purity water side-stream is removed from conduit 201 at 16,000 lbs/hour and contains about 20 ppm of dimethylamine. This can either be reused as process water or discharged untreated into a sewer.

It was mentioned above that when dimethylformamide is brought into contact with water some hydrolysis occurs. In addition to producing volatile amines such hydrolysis also produces involatile acids in particular formic acid. A further modification of the present invention relates to the separation of such involatile impurities from the dimethylformamide. When one attempts to separate the dimethylformamide and water by distillation any formic acid present tends to form the formic acid/dimethylformamide azeotrope, which boils at a temperature of approximately 163° C., related to an absolute pressure of 760 mm. of mercury. The boiling point of dimethylformamide is 153° C., related to an absolute pressure of 760 mm. of mercury. Consequently, the formic acid tends to concentrate, in the form of the azeotrope, at the base of a distillation column and, with an adequate number of plates provided in the column at sufficient reflux ratio, a substantially pure dimethylformamide stream can be removed from the column as a side-stream from a point located between the feed plate and the base of the column.

The quantity of formic acid usually passing through the process is small relative to the quantity of dimethylformamide. Consequently, because the dimethylformamide product is removed from the distillation column as a side-stream the relative rate of removal of formic acid contaminated material from the base of the distillation column is very small. Thus, if any non-volatile matter is present in the feed to the distillation column or forms, due to a process of polymerization under heat in the reboiler at the base of the column, the said non-volatile matter can accumulate to an extent at which it is precipitated particularly on the heating surfaces of the reboiler. This has the disadvantage that heating surfaces can become fouled and thus require cleaning, and, also, conditions conducive to corrosion are established.

It is a known technique, when fractionally distilling materials in which the bottoms product from the column is very small in volume, to purge this material from the column base and subsequently to distill it, to approaching dryness, in a separate pot still, the object of this operation being to recover the maximum quantity of volatile material from the column bottoms product. In this method of operation, it is usual to restrict the quantity of material leaving the column bottom to the minimum, so as to reduce the heating duty on the said pot still. The volume of the purge in a conventional system would be of the order of one-twentieth to one-fiftieth of the actual product flow e.g. of dimethylformamide. However, we have found that by operating in this way, the concentration of non-volatile material in the base of the distillation column and associated reboiler is liable to rise to a level at which precipitation on the heating surfaces of the equipment takes place.

According to this form of the present invention when the mixture of evaporated liquid components comprising water N,N'dimethylformamide, involatile impurities and optionally formic acid, an N,N'-dimethylformamide stream substantially free from involatile impurities and formic acid is recovered as a side-stream using fractional distillation apparatus by removing a liquid bottoms product from the distillation apparatus in sufficient quantity to substantially avoid precipitation of non-volatile material in the column or associated heating means, conveying the liquid bottoms product to still means such as to allow volatile constituents in the bottom product to be vaporized and returned to the distillation apparatus whilst retaining the remaining bottoms product in a conveniently dischargeable liquid condition as by the presence of unvaporized volatile materials, vaporizing volatile constituents in the bottoms product and returning them to the distillation apparatus, preferably to its base, and removing from the still means a liquid stream containing the non-volatile matter. It is illustrated in FIG. 3.

The throughput required and composition of the feed-stock will determine the volume of bottoms product which will have to be removed to substantially avoid precipitation but this volume will be relatively high compared with a conventional bottom purge. Thus whilst it is preferably of the same order as the dimethylformamide flow it may be significantly lower though it will always be in excess of one-tenth of the product flow and preferably in excess of one-half. The volume of the bottoms product will in turn determine the volume and heating capacity of the still means, which can be a pot still of continuous or batch type.

The pot still is desirably so constructed that fouling of its heating surfaces does not readily take place whilst if such fouling should occur it can relatively readily be removed as compared say with fouling in a distillation column or reboiler.

The still means are preferably fitted with mechanical agitator means to improve heat transfer and to assist in maintaining any precipitated solids in suspension.

If desired a number of stills could be provided, arranged so as to provide standby capability in the event say of one still requiring cleaning.

The feedstock is preferably produced by the method and apparatus described in conjunction with FIG. 1. Referring now to FIG. 3, 301 is a distillation column, with the feed entering the column via a conduit 302. The more volatile components in the feed are removed at the head of the column 301 in the vapor phase, via the conduit 303, passing to the condenser 304. The condensate from the said condenser is then divided into two portions, one of these returning to the head of the column 301 via the conduit 305 and the remainder passing out as overhead product, via the conduit 306. Alternatively the arrangement described in connection with FIG. 2 could be used.

The dimethylformamide product, leaves as a vapor side-stream via the conduit 307 passing into the condenser 308 and the resulting condensate leaving by the conduit 309.

A reboiler 310 is provided at the base of the distillation column to provide the heat necessary for distillation. Reflux liquid accumulating in the base of the column returns to the reboiler 310, via the conduit 311. Vaporized reflux, from the said reboiler, returns to the base of the column, via the conduit 312.

A continuous purge of liquid is taken from the base of the column via the conduit 313 into the pot still 314. The said pot still is heated by any known means and the feed entering it is substantially vaporized, the vapors returning to the base of the column 301 via the conduit 315. Liquid containing concentrated non-volatile matter, is discharged from the pot still 314 via the conduit 316, the said discharge taking place either intermittently or continuously according to convenience.

The pot still 314 may be fitted with a mechanically driven agitator 317.

In the conventional operation of such a plant in which the feed to the distillation column contained 10. w/w dimethylformamide, 1.0 ppm sodium chloride and the remainder water, since sodium chloride has a solubility of only about 500 ppm in dimethylformamide, a conventional purge of one-twentieth to one-fiftieth of the dimethylformamide flow would cause the concentration at the base of the column to be such that the salt would be nearly on the verge of crystallizing. If, in accordance with the present invention, the purge is for example equal to the dimethylformamide flow the concentration of salt would only rise to 10 ppm at the base of the column and crystallization would be extremely unlikely to occur.

A particularly satisfactory installation utilizes the combination of all the three foregoing features of the invention namely the salt separation of FIG. 1 the amine separation of FIG. 2 and the formic acid and involatile material separation of FIG. 3.

This combined process enables a reusable dimethylformamide stream to be produced and also an aqueous stream which can be discharged to waste without further treatment to be recovered from a raw waste product of sodium chloride, water and dimethylformamide and provides a relatively simple and uncomplicated process and relatively simple and cheap apparatus for carrying out the process.

The purpose of the purge is to ensure that solids particularly salt do not crystallize out at the bottom of the distillation column. The maximum concentration of solids which could be allowed to exist at the base of the column would vary with differing organic solvents and salts.

Thus if the solids concentration at the base of the column can be as high as 100 ppm if the input to the column only contains 10 percent DMF and 1.0 ppm of salt the purge would only need to be one-tenth of the DMF product flow. If the input to the column contained 5 ppm of salt a purge volume equal to the DMF product flow would keep the salt concentration at the base of the column at about 50 ppm and a purge volume of one-half the DMF product flow would keep the salt concentration at 100 ppm at the bottom of the column.

What I claim as my invention and desire to secure by letters patent is:

1. A method of recovering N,N'-dimethylformamide from a feedstock comprising water and, dissolved in the water, a minor amount of N,N'-dimethylformamide and at least one dissolved water-soluble solid non volatile inorganic salt having a low solubility in N,N'-dimethylformamide, the method comprising the steps of (a) feeding the feedstock continuously to an evaporation zone (b) continuously evaporating off part of the N,N'-dimethylformamide and water in said zone whereby to cause said dissolved solid to precipitate so that there is formed a mother liquor containing suspended crystals of said solid (c) drawing off from said zone a portion of said mother liquor containing suspended crystals of precipitated inorganic solid, (d) mechanically separating said solid from the suspending liquor, (e) then returning the liquor to said zone to mix with the mother liquor therein, (f) leading, as a vapor without condensation, the mixture of N,N'-dimethylformamide and water evaporated from said zone to a fractional distillation zone having heating surfaces at the base thereof, (g) distilling a substantially pure N,N'-dimethylformamide as a side stream from said fractional distillation zone while, (h) removing from the bottom of said distillation zone a stream of liquid impure N,N'-dimethylformamide containing said inorganic salt dissolved therein and also containing formic acid formed by hydrolysis of said dimethylformamide, the volumetric rate of removal of said impure stream being above one-tenth and up to 100 percent of the volumetric rate of flow of said substantially pure dimethylformamide side stream (i) conveying said liquid impure stream to another distillation zone, (j) in said other distillation zone, distilling off from said impure stream a vapor stream of volatile constituents and returning the latter stream to said fractional distillation zone as vapor without condensation whilst retaining in said other distillation zone a dischargable liquid mixture of said inorganic salt and unvaporized volatile materials and (k) removing from said other distillation zone a liquid stream containing said inorganic salt.

2. A method as claimed in claim 1 in which said volumetric rate of removal of said impure stream is in the range of from above 10 to 50 percent of said volumetric rate of flow of said substantially pure dimethylformamide side stream.

3. A method as claimed in claim 1 in which the inorganic salt is sodium chloride.

4. A method as claimed in claim 1 in which the mixture of N,N'-dimethylformamide and water evaporated from said evaporation zone contains volatile amines formed by hydrolysis of said dimethylformamide and said volatile amines are distilled off from the head of said fractional distillation zone and a water stream of effluent purity is distilled off as an overhead side stream from said fractional distillation zone by running the head of the fraction distillation zone under conditions of high reflux whereby to cause the volatile amines to concentrate therein.

5. Apparatus for recovering N,N'-dimethylformamide from a feedstock comprising water, and dissolved in the water, a minor amount of N,N'-dimethylformamide and at least one dissolved water soluble solid non volatile inorganic salt having a low solubility in N,N'-dimethylformamide which comprises a. evaporator means
b. means for feeding the feedstock continuously to the said evaporator means;
c. means for heating the evaporator means to continuously evaporate off part of the N,N'-dimethylformamide and water in said evaporator means whereby to cause said dissolved solid to precipitate so that there is formed a mother liquor containing suspended crystals of said solid,
d. means for drawing off from the said evaporator means a portion of said mother liquor containing suspended crystals of precipitated inorganic solid,
e. means for mechanically separating said solid from the suspended liquor,
f. means for then returning the liquor to the evaporator means to mix with the mother liquor therein,
g. fractional distillation means having heating surfaces at the base thereof,
h. means for leading, as a vapor without condensation, the mixture of N,N'-dimethylformamide and water evaporated from the evaporator means to the said fractional distillation means
i. means for distilling substantially pure N,N'-dimethylformamide as a side stream from said fraction distillation apparatus.
j. still means,
k. means for simultaneously removing from the bottom of said distillation apparatus a stream of liquid impure N,N'-dimethylformamide containing said inorganic salt dissolved therein and also containing formic acid formed by hydrolysis of said dimethylformamide, the volumetric rate of removal of said impure stream being above one-tenth and up to 100 percent of the volumetric rate of flow of said substantially pure dimethylformamide side stream,
l. means for conveying said liquid impure stream to said still means, m. means for heating said still means to distill off from said impure stream a vapor stream of volatile constituents whilst retaining in said still means a dischargable liquid mixture of said inorganic salt and unvaporized volatile materials, n. means for returning, as vapor without condensation, said stream of vaporized volatile constituents from the still means to the fractional distillation means, and o. means for removing from said still means a liquid stream containing said inorganic salt.

* * * * *